US008736571B1

(12) United States Patent
Guard et al.

(10) Patent No.: US 8,736,571 B1
(45) Date of Patent: May 27, 2014

(54) MESH DESIGN FOR TOUCH SENSORS (71) Applicants: David Brent Guard, Southampton (GB); Steven P. Emm, Southampton (GB); Philip Gareth Bentley, Cambridge (GB)

(72) Inventors: David Brent Guard, Southampton (GB); Steven P. Emm, Southampton (GB); Philip Gareth Bentley, Cambridge (GB)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 13/910,055

(22) Filed: Jun. 4, 2013

(51) Int. Cl.
*G06F 3/041* (2006.01)
*G06F 3/045* (2006.01)

(52) U.S. Cl.
USPC .......................................... 345/173; 345/174

(58) Field of Classification Search
CPC ............................................. G06F 2203/04112
USPC ..................... 345/173–174; 178/18.01, 18.06
See application file for complete search history.

(56) References Cited

U.S. PATENT DOCUMENTS

| | | | |
|---|---|---|---|
| 7,663,607 B2 | 2/2010 | Hotelling | |
| 7,864,503 B2 | 1/2011 | Chang | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 8,217,902 B2 | 7/2012 | Chang | |
| 8,591,279 B1 * | 11/2013 | Cok et al. | 445/24 |
| 2001/0035924 A1 * | 11/2001 | Fujieda | 349/65 |
| 2008/0309635 A1 | 12/2008 | Matsuo | |
| 2009/0315854 A1 | 12/2009 | Matsuo | |
| 2010/0149117 A1 * | 6/2010 | Chien et al. | 345/173 |
| 2011/0148781 A1 * | 6/2011 | Chen et al. | 345/173 |
| 2011/0291966 A1 * | 12/2011 | Takao et al. | 345/173 |
| 2012/0044165 A1 * | 2/2012 | Kwak et al. | 345/173 |
| 2012/0242588 A1 | 9/2012 | Myers | |
| 2012/0242592 A1 | 9/2012 | Rothkopf | |
| 2012/0242606 A1 * | 9/2012 | Mackey | 345/173 |
| 2012/0243151 A1 | 9/2012 | Lynch | |

(Continued)

FOREIGN PATENT DOCUMENTS

WO    WO 2012/129247    9/2012

OTHER PUBLICATIONS

U.S. Appl. No. 61/454,936, filed Mar. 21, 2011, Myers.
U.S. Appl. No. 61/454,950, filed Mar. 21, 2011, Lynch.

(Continued)

*Primary Examiner* — Matthew Fry
(74) *Attorney, Agent, or Firm* — Baker Botts LLP (57) ABSTRACT

In one embodiment, an apparatus includes a touch sensor including a mesh of multiple first lines and second lines of conductive material extending across a display. The first lines are substantially parallel to each other. The second lines are substantially parallel to each other. The display includes multiple pixels that each include sub-pixels. Each of the pixels has a first pixel pitch along a first axis and a second pixel pitch along a second axis that is perpendicular to the first axis. Each of the sub-pixels has a first sub-pixel pitch along the first axis, a first sub-pixel dimension along the first axis, and a second sub-pixel dimension along the second axis. The first lines extend across the display at a first angle relative to the first axis. The first angle is at least approximately equal to the arctangent of the ratio of the second sub-pixel dimension to the first pixel pitch.

20 Claims, 5 Drawing Sheets

(56) References Cited

U.S. PATENT DOCUMENTS

| | | |
|---|---|---|
| 2012/0243719 A1 | 9/2012 | Franklin |
| 2013/0076612 A1 | 3/2013 | Myers |
| 2013/0100054 A1* | 4/2013 | Philipp .................... 345/173 |
| 2013/0155000 A1* | 6/2013 | Trend et al. ................ 345/174 |
| 2013/0294037 A1* | 11/2013 | Kuriki et al. ............... 361/748 |
| 2013/0342472 A1* | 12/2013 | Guard ........................ 345/173 |

OTHER PUBLICATIONS

U.S. Appl. No. 61/454,894, filed Mar. 21, 2011, Rothkopf.

U.S. Appl. No. 14/031,372 (Guard), filed Sep. 19, 2013.

* cited by examiner

MESH DESIGN FOR TOUCH SENSORS

TECHNICAL FIELD

This disclosure generally relates to touch sensors.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

DESCRIPTION OF EXAMPLE EMBODIMENTS

Figure 1:
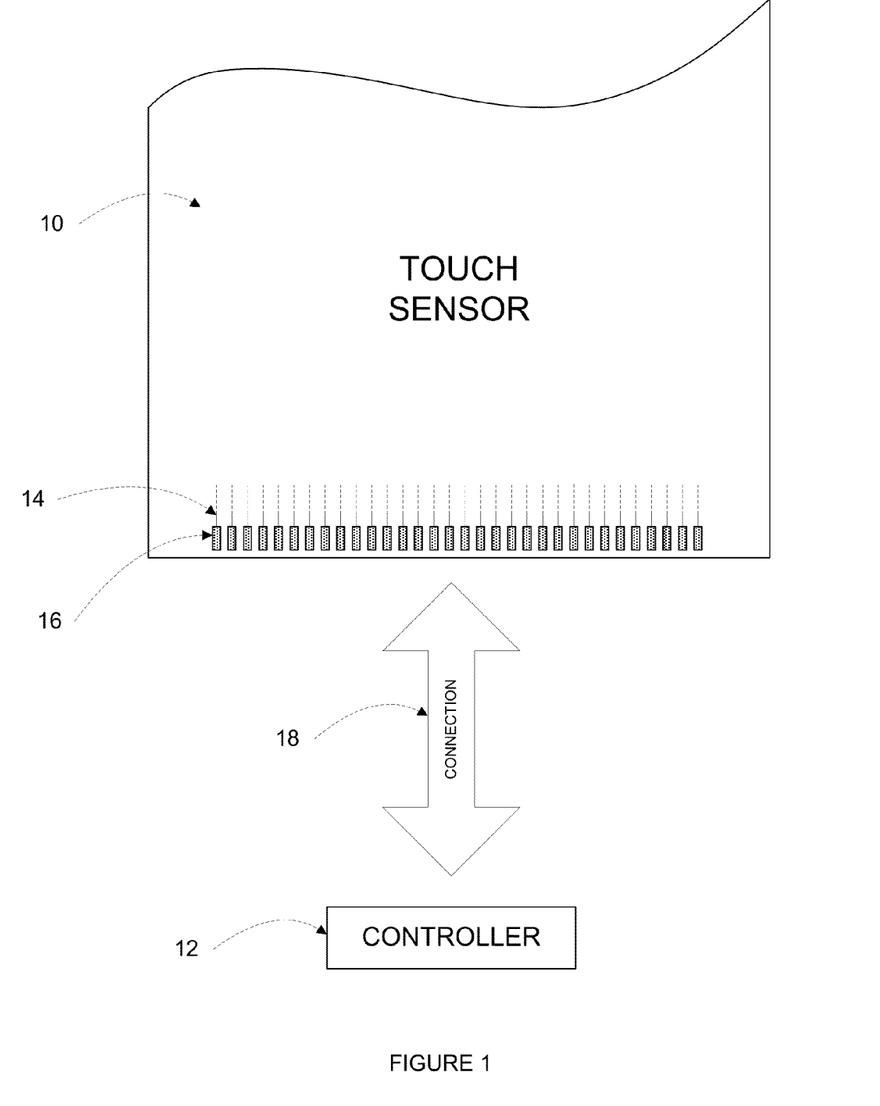
FIG. 1 illustrates an example touch sensor with an example touch-sensor controller.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 μm or less and a width of approximately 10 μm or less. As another example, one or more portions of the conductive material may be silver or silver-based and similarly have a thickness of approximately 5 μm or less and a width of approximately 10 μm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 µm or less. As another example, the conductive material of tracks 14 may be silver or silver-based and have a width of approximately 100 µm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2:
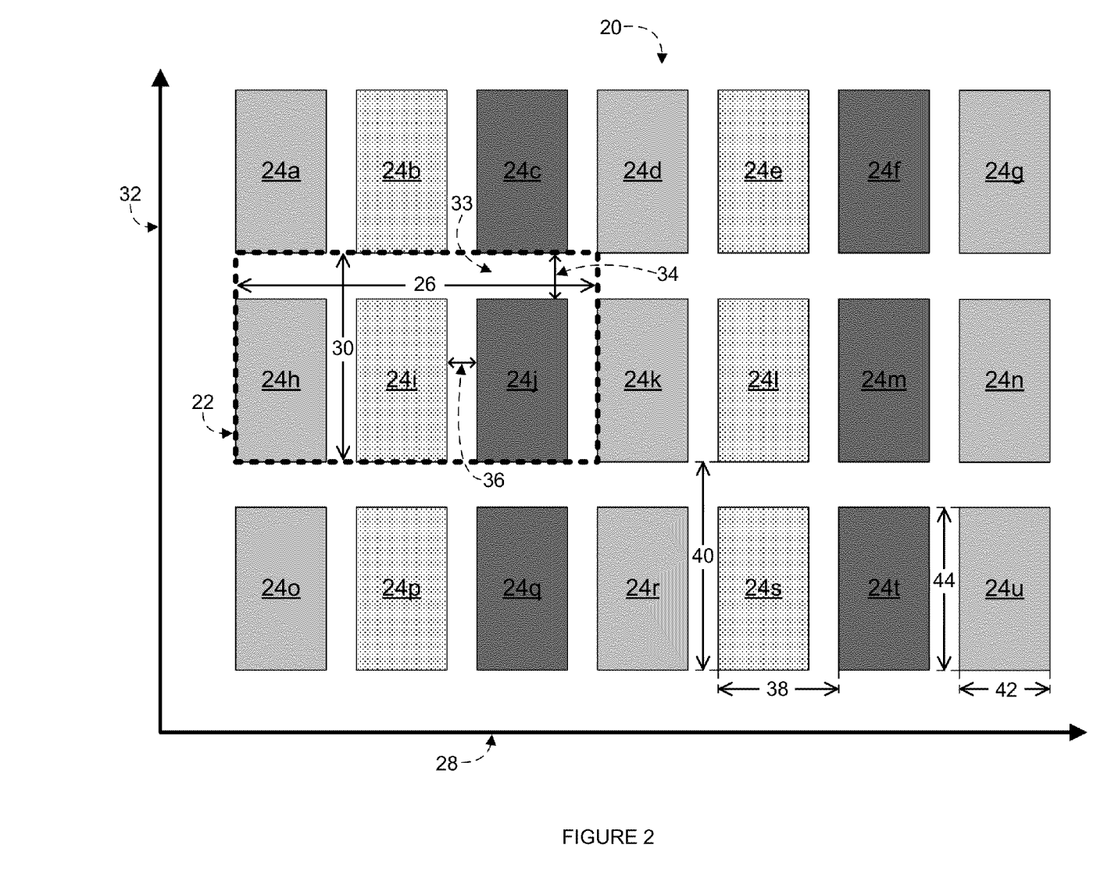
FIG. 2 illustrates an example portion of an example display including example pixels.

FIG. 2 illustrates an example portion 20 of an example display. A touch sensor may be overlaid on the display to implement a touch-sensitive display device, as described below. As an example and not by way of limitation, the display underneath the touch sensor may be a liquid crystal display (LCD), a light-emitting diode (LED) display, an LED backlight LCD, an electrophoretic display, a plasma display, or other suitable display. Although this disclosure describes and illustrates a particular display and particular display types, this disclosure contemplates any suitable device display and any suitable display types.

Portion 20 includes an array of pixels 22. In the example of FIG. 2, each pixel 22 includes three sub-pixels 24. In particular embodiments, each sub-pixel 24 may correspond to a particular color, such as for example red, green, or blue. The area of a pixel 22 (which may include dead space as discussed below) is indicated by the dashed-line border that encompasses sub-pixels 24*h*, 24*i*, and 24*j* in FIG. 2, where each sub-pixel may correspond to the color red, green, or blue, respectively.

The combined output of sub-pixels 24 determines the color and intensity of each pixel 22. Although this disclosure describes and illustrates example pixels 22 with a particular number of sub-pixels 24 having particular colors, this disclosure contemplates any suitable pixels with any suitable number of sub-pixels having any suitable colors.

Sub-pixels 24 may be arranged in a repeating pattern along a horizontal axis 28 and a vertical axis 32 that are perpendicular to each other. Although this disclosure describes and illustrates horizontal and vertical axes 28 and 32, this disclosure contemplates any suitable axes having any suitable orientation.

Each pixel 22 has a horizontal pixel pitch (HPP) 26, which in particular embodiments is defined as the distance between corresponding features of two adjacent pixels 22 along horizontal axis 28 (such as the distance from the left edge of sub-pixel 24*h* to the left edge of sub-pixel 24*k*). Each pixel 22 also has a vertical pixel pitch (VPP) 30, which in particular embodiments is defined as the distance between corresponding features of two adjacent pixels along vertical axis 32 (such as the distance from the lower edge of sub-pixel 24*i* to the lower edge of sub-pixel 24*b*). This disclosure contemplates any suitable pixels with any suitable HPPs and VPPs having any suitable values.

Each pixel 22 may also include dead space 33, which corresponds to regions of pixel 22 not occupied by a sub-pixel 24. In particular embodiments, dead space 33 has a height 34 that is defined as the distance between adjacent sub-pixels 24 along vertical axis 32 (such as the distance between sub-pixels 24*c* and 24*j*). In particular embodiments, dead space 33 has a width 36 that is defined as the distance between adjacent sub-pixels 24 along horizontal axis 28 (such as the distance between sub-pixels 24*i* and 24*j*). This disclosure contemplates any suitable pixels with any suitable dead space having any suitable dimensions.

Each sub-pixel 24 has a horizontal sub-pixel pitch (HSPP) 38, which is defined in particular embodiments as the distance between corresponding features of two adjacent sub-pixels along horizontal axis 28, including width 36 of dead space 33 (such as the distance between the left edges of sub-pixels 24*s* and 24*t*). Each sub-pixel 24 also has a vertical sub-pixel pitch (VSPP) 40, which is defined in particular embodiments as the distance between corresponding features of two adjacent sub-pixels along vertical axis 32, including height 34 of dead space 33 (such as the distance between the lower edges of sub-pixels 24*s* and 24*l*).

Each sub-pixel 24 has a sub-pixel width (SPW) 42, which is defined in particular embodiments as the dimension of a sub-pixel along horizontal axis 28 (such as the distance between the left and right edges of sub-pixel 24*u*). Each sub-pixel 24 also has a sub-pixel height (SPH) 44, which is defined in particular embodiments as the dimension of a sub-pixel along vertical axis 32 (such as the distance between the lower and upper edges of sub-pixel 24u). This disclosure contemplates any suitable sub-pixels with any suitable HSPPs, VSPPs, SPWs, and SPHs having any suitable values.

Pixel 22 and sub-pixel 24 may have a substantially rectangular shape, as illustrated in FIG. 2. Pixel 22 and sub-pixel 24 may have other suitable shapes, including but not limited to square, round, oval, or chevron-shaped. In the example of FIG. 2, vertical sub-pixel pitch 40 is equal to VPP 30, and VPP 30 is equal to the sum of SPH 44 and dead space height 34. Further, HPP 26 is equal to three times HSPP 38, and HSPP 38 is equal to the sum of sub-pixel width 42 and dead space width 36. Although this disclosure describes and illustrates example pixels 22 and example sub-pixels 24 having particular shapes, arrangements, and dimensions, this disclosure contemplates any suitable arrangement of any suitable pixels and sub-pixels having any suitable shapes and dimensions.

Figure 3:
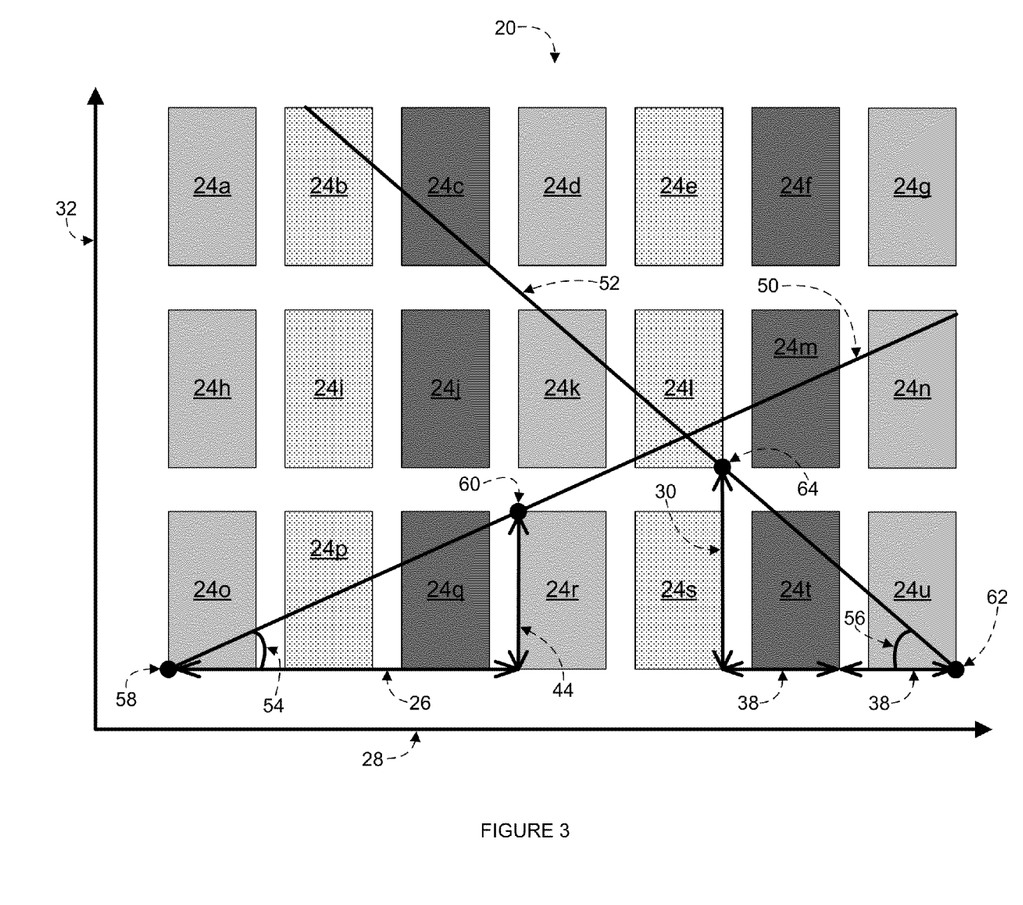
FIG. 3 illustrates example lines of an example mesh design.

FIG. 3 illustrates portion 20 of the example display of FIG. 2, with example conductive lines 50 and 52 overlying portion 20. Conductive lines 50 and 52 may be FLM and may make up part of a mesh pattern of an electrode of a touch sensor. Although this disclosure describes and illustrates a touch sensor overlying a display, this disclosure contemplates suitable portions of a touch sensor (including suitable portions of conductive lines 50 and 52) being disposed on one or more layers on or within a display stack of the display, where appropriate.

In the example of FIG. 3, conductive line 50 is oriented at an angle 54 relative to horizontal axis 28, and conductive line 52 is oriented at an angle 56 relative to horizontal axis 28. Angle 54 of conductive line 50 can be illustrated by drawing a line that passes through points 58 and 60, where point 58 is located at the lower left corner of sub-pixel 24o and point 60 is located at the upper left corner of sub-pixel 24r. The slope of conductive line 50 is defined as the vertical rise of conductive line 50 divided by the horizontal run of conductive line 50, and angle 54 can be found from the arctangent of the slope. In the example of FIG. 3, the vertical rise of conductive line 50 is SPH 44, and the horizontal run of conductive line 50 is HPP 26. Thus, the slope of conductive line 50 equals SPH/HPP and angle 54 ($\Theta_1$) can be found from the expression $$\Theta_1 = \arctan(SPH/HPP).$$

In the example of FIG. 3, angle 56 of conductive line 52 can be illustrated by drawing a line that passes through points 62 and 64, where point 62 is located at the lower right corner of sub-pixel 24u and point 64 is located at the lower right corner of sub-pixel 24l. The slope of conductive line 52 is defined as the vertical rise of conductive line 52 divided by the horizontal run of conductive line 52, and angle 56 can be found from the arctangent of the slope. In the example of FIG. 3, the vertical rise of conductive line 52 is VPP 30, and the horizontal run of conductive line 52 is two times HSPP 38. Thus, the slope of conductive line 52 equals VPP/2·HSPP, and angle 56 ($\Theta_2$) can be found from the expression $\Theta_2$=arctan $$\Theta_2 = \arctan(VPP/2 \cdot HSPP).$$

In particular embodiments, conductive lines 50 and 52 may make up part of a mesh pattern of a touch sensor and angles $\Theta_1$ and $\Theta_2$ may vary by up to approximately 1° from the values calculated in the expressions above without substantially degrading the optical performance of the mesh pattern. Angles $\Theta_1$ and $\Theta_2$ of conductive lines 50 and 52 in FIGS. 4A-4C and 5 (which are described below) may similarly vary.

In the example of FIG. 3, conductive line 50 is oriented counterclockwise at angle 54 relative to horizontal axis 28, and conductive line 52 is oriented clockwise at angle 56 relative to horizontal axis 28. Although this disclosure describes and illustrates example conductive lines 50 and 52 having particular orientations relative to horizontal axis 28, this disclosure contemplates any suitable clockwise or counterclockwise orientation of conductive lines relative to any suitable axis. In particular embodiments, conductive lines 50 and 52 may make up part of a mesh pattern of a touch sensor and the mesh pattern may have any suitable rotational orientation relative to horizontal axis 28 or vertical axis 32 (which may differ from the rotational orientation illustrated in FIG. 3) without substantially degrading the optical performance of the mesh pattern. Such rotation may occur during a manufacturing process. Similarly, a mesh pattern made up of conductive lines 50 and 52 in any of FIGS. 4A-4C and 5 (described below) may have any suitable rotational orientation. In particular embodiments, the mesh pattern may have any suitable alignment relative to pixels 22 and sub-pixels 24 (which may differ from the alignment illustrated in FIG. 3). For example, the mesh pattern may be displaced horizontally, vertically, or both relative to pixels 22 and sub-pixels 24 (as may occur during a manufacturing process) without substantially degrading the optical performance of the mesh pattern. In particular embodiments, conductive line 50 need not be constrained to pass through points 58 and 60 but may be displaced along horizontal axis 28 and vertical axis 32 by any suitable amount. Similarly, in particular embodiments, conductive line 52 need not be constrained to pass through points 62 and 64 but may also be displaced along horizontal axis 28 and vertical axis 32 by any suitable amount. A mesh pattern made up of conductive lines 50 and 52 in any of FIGS. 4A-4C and 5 (which are described below) may similarly have any suitable alignment.

Although this disclosure describes and illustrates a touch sensor with only a single layer of conductive lines 50 and 52, this disclosure contemplates a touch sensor with any suitable number of layers of conductive lines 50 and 52. As an example, the touch sensor may have a first layer of conductive lines 50 and 52 disposed on one side of a single substrate and a second layer of conductive lines 50 and 52 disposed on another side of the substrate. As another example, the touch sensor may have a first layer of conductive lines 50 and 52 disposed on one side of one substrate and a second layer of conductive lines 50 and 52 disposed on one side of another substrate. In such dual-layer touch-sensor configurations, one of the layers of conductive lines 50 and 52 may provide drive electrodes of the touch sensor and the other layer of conductive lines 50 and 52 may provide sense electrodes of the touch sensor. Moreover, in such dual-layer touch-sensor configurations, first layer of conductive lines 50 and 52 and second layer of conductive lines 50 and 52 may be offset from each other by a specific distance along a specific direction. For example, in particular embodiments, first layer of conductive lines 50 and 52 may be offset from second layer of conductive lines 50 and 52 by a distance along horizontal axis 28 that is substantially equal to three times HPP 26 (or nine times HSPP 38). This disclosure similarly contemplates a touch sensor with any suitable number of layers of conductive lines 50 and 52 in the mesh design of any of FIGS. 4A-4C and 5 (which are described below).

Figure 4A:
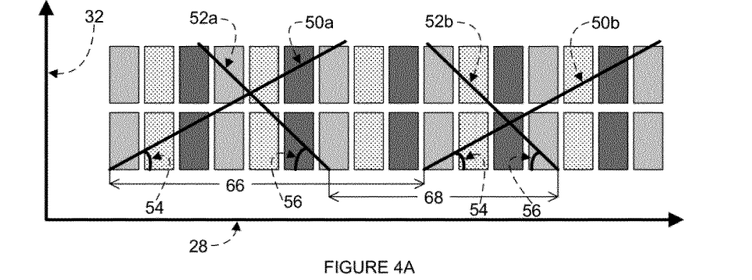
FIGS. 4A-4C illustrate example mesh designs.
Figure 4B:
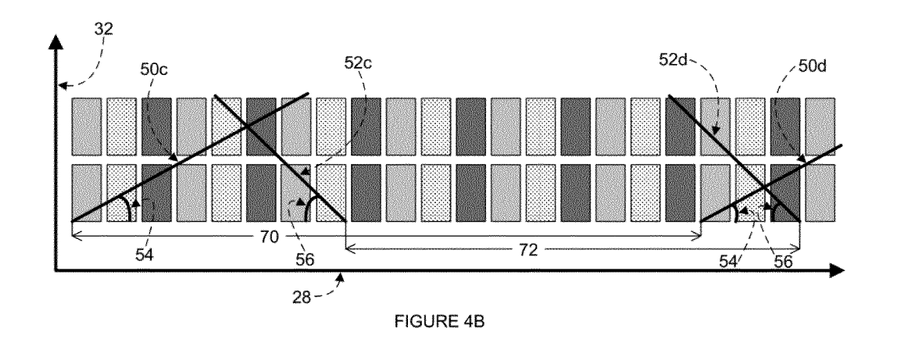
Figure 4C:
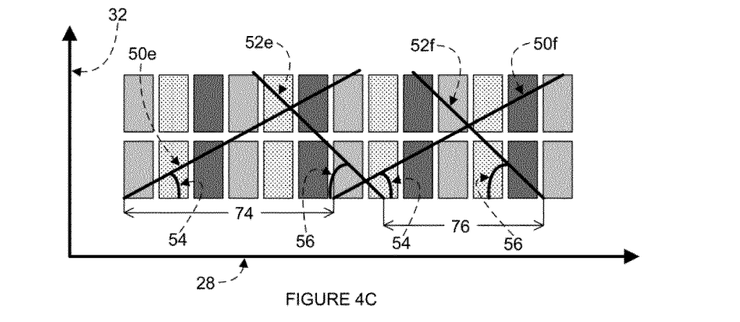

FIGS. 4A-4C illustrate example mesh designs of conductive lines 50 and 52 overlaid on an example display portion, similar to portion 20. As in FIG. 3, conductive lines 50 and 52 in the examples of FIGS. 4A-4C may be FLM and may be part of a mesh pattern of a touch sensor. Conductive lines 50 in FIGS. 4A-4C are substantially parallel to each other, and each conductive line 50 forming an angle 54 relative to horizontal axis 28. Additionally, conductive lines 50 are substantially evenly spaced from one another with adjacent conductive lines 50 having an equal separation distance. Conductive lines 52 in FIGS. 4A-4C are also substantially parallel to each other, forming an angle 56 relative to horizontal axis 28. Conductive lines 52 are also substantially evenly spaced from one another with adjacent conductive lines 52 having an equal separation distance.

In the example of FIG. 4A, conductive lines 50a and 50b have a separation distance 66 along horizontal axis 28 that is substantially equal to three times HPP 26 (or nine times HSPP 38) and conductive lines 52a and 52b have a separation distance 68 along horizontal axis 28 that is substantially equal to 13/6 times HPP 26 (or 6.5 times HSPP 38). The mesh design of FIG. 4A may be preferable for a display with an HPP of approximately 150 µm. In the example mesh design of FIG. 4B, conductive lines 50c and 50d have a separation distance 70 along horizontal axis 28 that is substantially equal to six times HPP 26 (or 18 times HSPP 38) and conductive lines 52c and 52d have a separation distance 72 along horizontal axis 28 that is substantially equal to 13/3 times HPP 26 (or 13 times HSPP 38). The mesh design of FIG. 4B may be preferable for a display with an HPP that is substantially less than 150 µm. In the example mesh design of FIG. 4C, conductive lines 50e and 50f have a separation distance 74 along horizontal axis 28 that is substantially equal to two times HPP 26 (or six times HSPP 38) and conductive lines 52e and 52f have a separation distance 76 along horizontal axis 28 that is substantially equal to the sum of HPP 26, HSPP 38, dead space width 36, and ½ of sub-pixel width 42. The mesh design of FIG. 4C may be preferable for a display with an HPP of approximately 250 µm. Although this disclosure describes and illustrates particular separation distances between conductive lines, this disclosure contemplates any suitable separation distances between any suitable conductive lines.

In particular embodiments, conductive lines 50 and 52 are substantially straight lines. In addition or as an alternative, in particular embodiments, non-linear conductive line patterns may be used to avoid long linear stretches of conductive metal with a repeat frequency, which may reduce the appearance of interference or moiré patterns. As an example and not by way of limitation, one or more segments of one or more conductive lines 50 and 52 may be substantially sinusoidal. In particular embodiments, conductive lines 50 and 52 may have a sinusoidal variation with a peak-to-peak amplitude between 0 and 30 µm. Additionally, in particular embodiments, conductive lines 50 may have a sinusoidal variation with a period approximately equal to the separation distance between conductive lines 52 as measured along conductive lines 50. Similarly, in particular embodiments, conductive lines 52 may have a sinusoidal variation with a period approximately equal to the separation distance between conductive lines 50 as measured along conductive lines 52. Although this disclosure describes and illustrates particular meshes that have particular conductive lines 50 and 52 with particular curves (e.g., substantially straight or substantially sinusoidal), this disclosure contemplates any suitable meshes that have any suitable conductive lines with any suitable curves.

Figure 5:
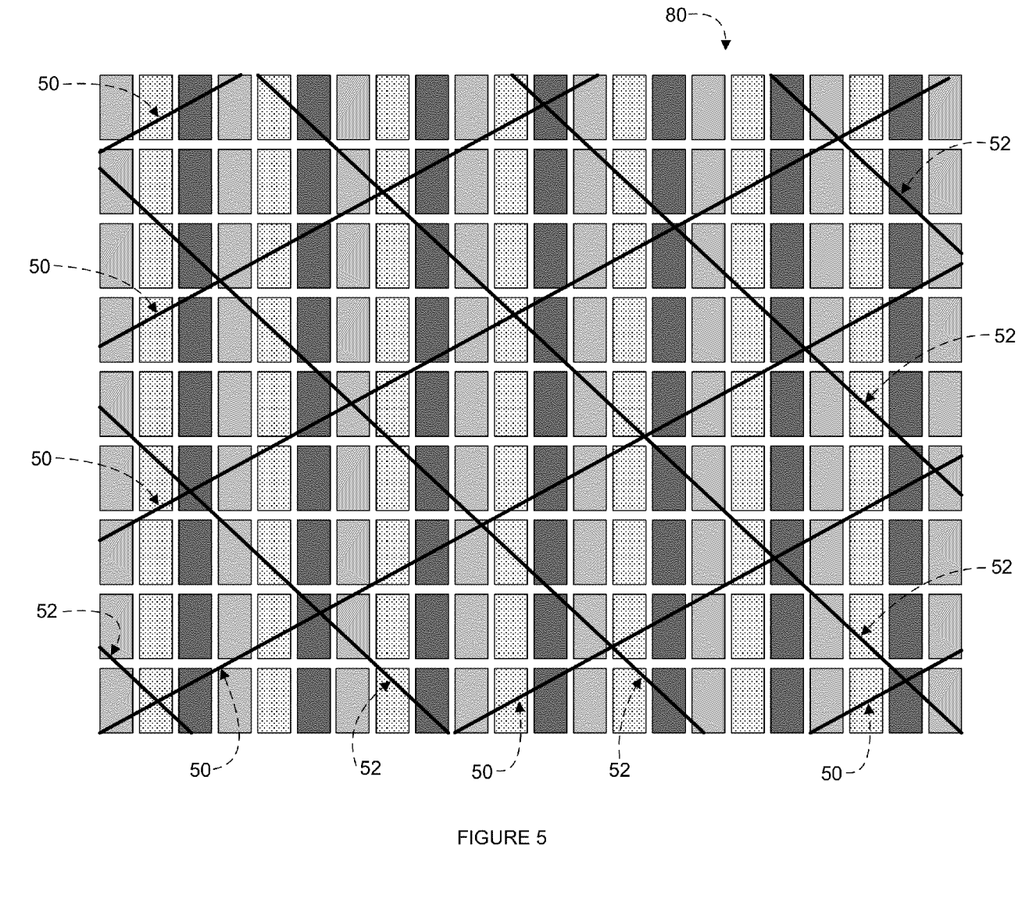
FIG. 5 illustrates the example mesh design of FIG. 4A over a larger portion of an example display.

FIG. 5 illustrates the example mesh design of FIG. 4A over a larger portion 80 of an example display. The display may be an LCD, LED display, an LED backlight LCD, an electrophoretic display, a plasma display, or other suitable display and may include an array of pixels that each include three sub-pixels, as described above with reference to FIG. 2. In the example of FIG. 5, conductive lines 50 and 52 overlie portion 80. Conductive lines 50 and 52 may be FLM and make up part of a mesh pattern of a touch sensor. Although this disclosure describes and illustrates a touch sensor overlying a display, this disclosure contemplates suitable portions of a touch sensor (including suitable portions of conductive lines 50 and 52) being disposed on one or more layers on or within a display stack of the display, where appropriate.

In the example of FIG. 5, conductive lines 50 have a slope that equals SPH/HPP for the display that they overlie and a counterclockwise angle with respect to a horizontal axis across the display that equals the arctangent of SPH/HPP. Conductive lines 52 have a slope that equals VP/2·HSPP for the display that they overlie and a clockwise angle with respect to the same horizontal axis that equals the arctangent of VP/2·HSPP. Conductive lines 50 are substantially parallel to each other and substantially evenly spaced from one another. Conductive lines 52 are also substantially parallel to each other and substantially evenly spaced from one another. The separation distance between adjacent conductive lines 50 along the horizontal axis is substantially equal to three times HPP (or nine times HSPP) for the display that they overlie, and the separation distance between adjacent conductive lines 52 along the horizontal axis is substantially equal to 13/6 times HPP (or 6.5 times HSPP) for the display that they overlie.

Herein, reference to a computer-readable non-transitory storage medium or media may include one or more semiconductor-based or other integrated circuits (ICs) (such, as for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An apparatus comprising:
a touch sensor comprising a mesh of conductive material, wherein:
the mesh comprises a plurality of first lines and a plurality of second lines of conductive material extending across a display, the first lines being substantially parallel to each other, the second lines being substantially parallel to each other, the display comprising a plurality of pixels that each comprise sub-pixels and dead space, each of the sub-pixels comprising a color element separated from adjacent sub-pixels by dead space, each of the pixels having a first pixel pitch along a first axis and a second pixel pitch along a second axis that is perpendicular to the first axis, the first pixel pitch being equal to a distance between corresponding features of two adjacent pixels along the first axis, the second pixel pitch being equal to a distance between corresponding features of two adjacent pixels along the second axis, each of the sub-pixels having a first sub-pixel pitch along the first axis, a first sub-pixel dimension along the first axis, and a second sub-pixel dimension along the second axis, the first sub-pixel pitch being equal to a distance between corresponding features of two adjacent sub-pixels along the first axis, the first sub-pixel dimension being equal to a distance between opposing edges of the color element of a sub-pixel along the first axis, the second sub-pixel dimension being equal to a distance between opposing edges of the color element of a sub-pixel along the second axis;
the first lines extend across the display at a first angle relative to the first axis, wherein the first angle is within 1° of the arctangent of the ratio of the second sub-pixel dimension to the first pixel pitch; and
the second lines extend across the display at a second angle relative to the first axis, wherein the second angle is different from the first angle and is within 1° of the arctangent of the ratio of the second pixel pitch to twice the first sub-pixel pitch; and
one or more computer-readable non-transitory storage media coupled to the touch sensor and embodying logic that is configured when executed to control the touch sensor.

2. The apparatus of claim 1, wherein:
the first angle is oriented counterclockwise relative to the first axis; and
the second angle is oriented clockwise relative to the first axis.

3. The apparatus of claim 1, wherein first lines that are adjacent to each other are separated from each other along the first axis by a distance approximately equal to three times the first pixel pitch.

4. The apparatus of claim 1, wherein second lines that are adjacent to each other are separated from each other along the first axis by a distance approximately equal to 13/6 of the first pixel pitch.

5. The apparatus of claim 1, wherein first lines that are adjacent to each other are separated from each other along the first axis by a distance approximately equal to six times the first pixel pitch.

6. The apparatus of claim 1, wherein second lines that are adjacent to each other are separated from each other along the first axis by a distance approximately equal to 13/3 of the first pixel pitch.

7. The apparatus of claim 1, wherein first lines that are adjacent to each other are separated from each other along the first axis by a distance approximately equal to two times the first pixel pitch.

8. The apparatus of claim 1, wherein:
each of the sub-pixels has a first sub-pixel dead space dimension along the first axis; and
second lines that are adjacent to each other are separated from each other along the first axis by a distance approximately equal to a sum of:
the first pixel pitch;
the first sub-pixel pitch;
the first sub-pixel dead space dimension; and
½ of the first sub-pixel dimension.

9. The apparatus of claim 1, wherein:
the first axis is horizontal;
the second axis is vertical;
the first pixel pitch along the first axis is a width;
the second pixel pitch along the second axis is a height;
the first sub-pixel pitch along the first axis is a width;
the first sub-pixel dimension along the first axis is a width; and
the second sub-pixel dimension along the second axis is a height.

10. The apparatus of claim 1, wherein the sub-pixels are substantially rectangular.

11. The apparatus of claim 1, wherein one or more segments of one or more of the first or second lines are substantially sinusoidal.

12. A touch sensor comprising:
a mesh of conductive material, wherein:
the mesh comprises a plurality of first lines and a plurality of second lines of conductive material extending across a display, the first lines being substantially parallel to each other, the second lines being substantially parallel to each other, the display comprising a plurality of pixels that each comprise sub-pixels and dead space, each of the sub-pixels comprising a color element separated from adjacent sub-pixels by dead space, each of the pixels having a first pixel pitch along a first axis and a second pixel pitch along a second axis that is perpendicular to the first axis, the first pixel pitch being equal to a distance between corresponding features of two adjacent pixels along the first axis, the second pixel pitch being equal to a distance between corresponding features of two adjacent pixels along the second axis, each of the sub-pixels having a first sub-pixel pitch along the first axis, a first sub-pixel dimension along the first axis, and a second sub-pixel dimension along the second axis, the first sub-pixel pitch being equal to a distance between corresponding features of two adjacent sub-pixels along the first axis, the first sub-pixel dimension being equal to a distance between opposing edges of the color element of a sub-pixel along the first axis, the second sub-pixel dimension being equal to a distance between opposing edges of the color element of a sub-pixel along the second axis;
the first lines extend across the display at a first angle relative to the first axis, wherein the first angle is within 1° of the arctangent of the ratio of the second sub-pixel dimension to the first pixel pitch; and the second lines extend across the display at a second angle relative to the first axis, wherein the second angle is different from the first angle and is within 1° of the arctangent of the ratio of the second pixel pitch to twice the first sub-pixel pitch.

13. The touch sensor of claim 12, wherein:
the first angle is oriented counterclockwise relative to the first axis; and
the second angle is oriented clockwise relative to the first axis.

14. The touch sensor of claim 12, wherein first lines that are adjacent to each other are separated from each other along the first axis by a distance approximately equal to three times the first pixel pitch.

15. The touch sensor of claim 12, wherein second lines that are adjacent to each other are separated from each other along the first axis by a distance approximately equal to 13/6 of the first pixel pitch.

16. The touch sensor of claim 12, wherein first lines that are adjacent to each other are separated from each other along the first axis by a distance approximately equal to six times the first pixel pitch.

17. The touch sensor of claim 12, wherein second lines that are adjacent to each other are separated from each other along the first axis by a distance approximately equal to 13/3 of the first pixel pitch.

18. The touch sensor of claim 12, wherein first lines that are adjacent to each other are separated from each other along the first axis by a distance approximately equal to two times the first pixel pitch.

19. The touch sensor of claim 12, wherein:
each of the sub-pixels has a first sub-pixel dead space dimension along the first axis; and
second lines that are adjacent to each other are separated from each other along the first axis by a distance approximately equal to a sum of:
the first pixel pitch;
the first sub-pixel pitch;
the first sub-pixel dead space dimension; and
½ of the first sub-pixel dimension.

20. The touch sensor of claim 12, wherein:
the first axis is horizontal;
the second axis is vertical;
the first pixel pitch along the first axis is a width;
the second pixel pitch along the second axis is a height;
the first sub-pixel pitch along the first axis is a width;
the first sub-pixel dimension along the first axis is a width; and
the second sub-pixel dimension along the second axis is a height.

* * * * *